A. J. PETERS.
ELASTIC TUG-LINKS FOR HARNESS.

No. 172,479.              Patented Jan. 18, 1876

Attest.
Edward Barthel
Theo. S. Dey

Inventor.
A. J. Peters
By Atty
Thos. S. Sprague

UNITED STATES PATENT OFFICE.

AUGUST J. PETERS, OF CHICAGO, ILLINOIS.

IMPROVEMENT IN ELASTIC TUG-LINKS FOR HARNESS.

Specification forming part of Letters Patent No. 172,479, dated January 18, 1876; application filed December 14, 1875.

*To all whom it may concern:*

Be it known that I, AUGUST J. PETERS, of Chicago, in the county of Cook and State of Illinois, have invented an Improved Elastic Tug-Link for Harness, of which the following is a specification:

My invention has for its object to provide an elastic link for a harness-tug, for easing up the impact of the collar upon a horse's shoulders when starting to pull a heavy load.

My invention consists in a tube, through which is inserted the elongated shank of the trace-hook, engaging with a washer, between which and the other end of the tube is interposed a series of elastic washers or springs. The front end of the tube is provided with a link to couple it to the trace.

Figure 1:
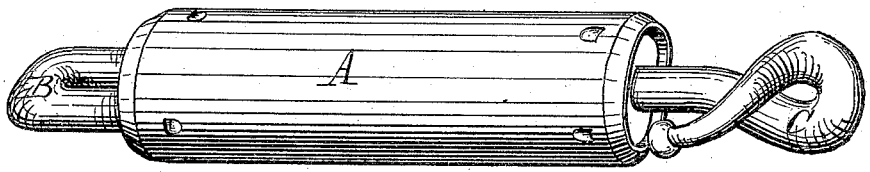
Figure 2:
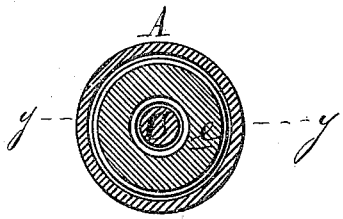
Figure 3:
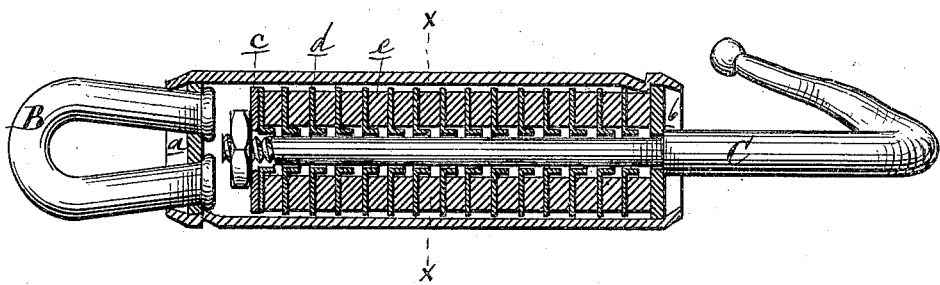

Figure 1 is a perspective view. Fig. 2 is a cross-section at $x\ x$. Fig. 3 is a longitudinal section at $y\ y$.

In the drawing, A represents a metal tube, closed at one end by welding in a thick washer or head, $a$, having a link, B, welded in it to connect it with the trace-chain. $b$ is a thick washer welded into the other end of the tube, through which washer passes an elongated shank of the trace-hook C, having a nut screwed on its inner end, resting on a metal washer, $c$, between which and the washer $b$ are interposed thin metal washers $d$ and rubber spring-washers $e$, in alternating series, which latter yield to any strain suddenly put on them by starting up, or in jolting over uneven roads.

The effect of the elastic link is to ease up the impact of the collar on the horse's shoulders under these conditions, thereby enabling him to draw heavy loads with greater ease, and with less liability of galling him.

My device forms a compact and convenient link, and one in which the parts are protected from the effects of the weather, and are not liable to get out of order.

What I claim as my invention is—

The tug-link described, and in combination the tubular shell A, having the heads $a\ b$ and link B, the hook C, having an elongated shank, provided with a screw-threaded end and nut, the metal washers $c\ d$, and rubber washers $e$, all constructed and arranged substantially as described and shown.

AUG. J. PETERS.

Witnesses:
 WM. H. LOTZ,
 WM. HOFFMANN.